United States Patent
Alarji et al.

(10) Patent No.: US 12,226,774 B2
(45) Date of Patent: Feb. 18, 2025

(54) MICROFLUIDIC DEVICE AND DIRECT MEASUREMENT OF REACTION RATE

(71) Applicant: SAUDI ARABIAN OIL COMPANY, Dhahran (SA)

(72) Inventors: Hamad Alarji, Zetland (AU); Yara Alzahid, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 446 days.

(21) Appl. No.: 17/036,562

(22) Filed: Sep. 29, 2020

(65) Prior Publication Data
US 2022/0097065 A1 Mar. 31, 2022

(51) Int. Cl.
*B01L 3/00* (2006.01)
*G01N 21/29* (2006.01)

(52) U.S. Cl.
CPC ........ *B01L 3/502769* (2013.01); *G01N 21/29* (2013.01); *B01L 2200/10* (2013.01); *B01L 2300/0864* (2013.01)

(58) Field of Classification Search
None
See application file for complete search history.

(56) References Cited

U.S. PATENT DOCUMENTS

| | | | | |
|---|---|---|---|---|
| 4,882,763 A * | 11/1989 | Buchan | ........... | G09B 23/08 382/162 |
| 5,324,956 A * | 6/1994 | Fagan | ........... | G01L 11/025 250/231.19 |
| 7,561,998 B2 | 7/2009 | Panga et al. | | |
| 10,365,196 B2 * | 7/2019 | Gimenez Calbo | ... | G01N 33/246 |
| 10,871,431 B2 * | 12/2020 | Almaskeen | ........... | G01N 7/00 |
| 2017/0198573 A1 * | 7/2017 | Kim | ........... | E21B 43/26 |
| 2021/0018436 A1 * | 1/2021 | Ow | ........... | G01N 21/643 |

FOREIGN PATENT DOCUMENTS

| CN | 111065745 A | 4/2020 |
|---|---|---|
| EP | 2104082 B1 | 6/2017 |

OTHER PUBLICATIONS

Polak et al., Spontaneous switching of permeability changes in a limestone fracture with net dissolution, 2004, Water Resources Research, vol. 40, p. 1-10. (Year: 2004).*

(Continued)

*Primary Examiner* — Lore R Jarrett
(74) *Attorney, Agent, or Firm* — Osha Bergman Watanabe & Burton LLP

(57) ABSTRACT

Embodiments disclosed herein may relate to a testing apparatus. The testing apparatus may include a sealed, chemically-resistant testing apparatus body defining a testing void; a first fluid port and a second fluid port; and a first geomaterial and a second geomaterial. The first and second geomaterials may be positioned between the first fluid port and the second fluid port and relative to one another such that a flow channel may be provided between the first and second geomaterials. The first and second geomaterials may be coupled to a testing void interior surface so as to restrict flow to the flow channel between an upflow region and a downflow region of the testing void. The first and second geomaterials may be comprised of a natural formation material.

11 Claims, 4 Drawing Sheets

(56) References Cited

OTHER PUBLICATIONS

Translation and Foreign reference of FR-2928484-A1, 2009, pp. 1-8 of English translation and figures in Foreign reference. (Year: 2009).*

Rabie, Ahmed I. et al., "Reaction of In-Situ-Gelled Acids with Calcite: Reaction-Rate Study", SPE 133501, SPE Journal, Society of Petroleum Engineers, Dec. 2011, pp. 981-992 (12 pages).

Lund, K. et al., "Kinetic Rate Expressions for Reactions of Selected Minerals with HCl and HF Mixtures", SPE 4348, Society of Petroleum Engineers of AIME, May 1973, pp. 5-23 (18 pages).

Song, Wen and Anthony R. Kovscek, "Functionalization of micromodels with kaolinite for investigation of low salinity oil-recovery processes", Lab on a Chip, Royal Society of Chemistry, vol. 15, Jun. 2015, pp. 3314-3325 (12 pages).

Song, Wen et al., "Chip-off-the-old-rock: the study of reservoir-relevant geological processes with real-rock micromodels", Lab on a Chip, Royal Society of Chemistry, vol. 14, Sep. 2014, pp. 4382-4390 (9 pages).

Porter, Mark L. et al., "Geo-material microfluids at reservoir conditions for subsurface energy resource applications", LA-UR-15-24691, Los Alamos National Laboratory, Oct. 2016, permalink URL: <http://permalink.lanl.gov/object/view?what=info:lanl-repo/LA-UR-15-24691> (11 pages).

International Search Report and Written Opinion issued in Application No. PCT/US2021/052608, mailed on Dec. 14, 2021 (16 pages).

D. Elsworth and H. Yasuhara, "Short-Timescale Chemo-Mechanical Effects and their Influence on the Transport Properties of Fractured Rock", Pure and Applied Geophysics; vol. 163; Issue 10; Oct. 2006; pp. 2051-2070 (20 pages).

* cited by examiner

MICROFLUIDIC DEVICE AND DIRECT MEASUREMENT OF REACTION RATE

BACKGROUND

Acid stimulation, such as by matrix acidizing or acid fracturing, is a primary stimulation technique for oil and gas wells, having particular utility for improving the near-wellbore permeability. The efficacy of such acidization processes often depend upon forming deep, conductive flow channels called "wormholes" within the formation. Consequently, the well productivity enhancement depends on the length and diameter of these wormholes.

Recent research has revealed that introducing a small quantity of acidic fluids into a carbonate reservoir during secondary recovery greatly improves the oil recovery. Thus, it is important to understand the effects of controlled pH fluids on the overall recovery of a formation. One primary parameter for the effect of such an acid injection operation is the reaction rate between the injected acidic fluid and the reservoir rock.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein may relate to a testing apparatus. The testing apparatus may include a sealed, chemically-resistant testing apparatus body defining a testing void; a first fluid port and a second fluid port; and a first geomaterial and a second geomaterial. The first and second geomaterials may be positioned between the first fluid port and the second fluid port and relative to one another such that a flow channel may be provided between the first and second geomaterials. The first and second geomaterials may be coupled to a testing void interior surface so as to restrict flow to the flow channel between an upflow region and a downflow region of the testing void. The first and second geomaterials may be comprised of a natural formation material.

In some embodiments, the testing apparatus body may be at least partially transparent.

In some embodiments, the flow channel may have a cross-sectional area of 10 square millimeters or less. In some embodiments, the flow channel may have a cross-sectional area of between 0.0001 $mm^2$ and 10 $mm^2$.

In some embodiments, a contact area between first and a second geomaterial and the reactant fluid may be 40 square millimeters or less. In some embodiments, a contact area between first and a second geomaterial and the reactant fluid may be between 0.0002 square millimeters and 40 square millimeters.

In some embodiments, the flow channel may have a width of 4 millimeters or less.

In some embodiments, the flow channel may have a width of between 0.01 millimeters and 4 millimeters.

In one aspect, embodiments disclosed herein may relate to a testing system. In some embodiments, the testing system may include a testing apparatus and a fluid pump fluidly connected to the first fluid port for supplying a reactant fluid. In some embodiments, the testing apparatus may include a sealed, chemically-resistant testing apparatus body defining a testing void; a first fluid port; and a first geomaterial and a second geomaterial. In some embodiments, the first and second geomaterials may be positioned downflow from the first fluid port and relative to one another such that a flow channel may be provided between the first and second geomaterials. In some embodiments, the first and second geomaterials may be coupled to a testing void interior surface so as to restrict flow to the flow channel between an upflow region and a downflow region of the testing void. In some embodiments, the first and second geomaterials may be comprised of a natural formation material.

In some embodiments, the testing system may further include a flow meter for measuring an effluent flowrate of one or more of the product fluids.

In some embodiments, the testing system may further include an image capturing device configured to capture images of the testing apparatus during flow of the reactant fluid.

In some embodiments, the testing system may further include an image processor communicatively connected to the image capturing device configured to process the images In some embodiments, the testing system may further include a second fluid port positioned opposite the first fluid port such that the fluid channel may be provided from the first fluid port to the second fluid port In some embodiments, the testing system may further include an effluent container fluidly connected to the second fluid port for collecting product fluids.

In some embodiments, the testing system may further include a chemical analyzer for determining a chemical composition of one or more of the product fluids.

In one aspect, embodiments disclosed herein may relate to a method for measuring a reaction rate between a reactant fluid and a natural formation material. The method may include introducing the reactant fluid into a testing apparatus via a first fluid port, the testing apparatus comprising the first fluid port and a first and a second geomaterial formed of the natural formation material. The method may include flowing the reactant fluid through a flow channel provided between the first and second geomaterials. The method may include reacting the reactant fluid with the natural formation material to form product fluids. The method may include determining the reaction rate using a reaction duration, a quantity of at least one of the product fluids, and a contact area between first and a second geomaterial and the reactant fluid.

In some embodiments, the method may further include capturing images of the testing apparatus.

In some embodiments, determining the reaction rate may include analyzing the images to measure a volume of a gaseous product of the product fluids.

In some embodiments, the method may further include collecting an effluent exiting the testing apparatus, where the effluent comprises at least one of the product fluids.

In some embodiments, determining the reaction rate may include determining a chemical composition of the effluent.

In some embodiments, determining the reaction rate may include measuring a quantity of the effluent.

In some embodiments, determining the reaction rate may include measuring an effluent flowrate of the effluent.

In some embodiments, the method may further include adding a colorant to the reactant fluid prior to introducing the reactant fluid into the testing apparatus.

In some embodiments, determining the reaction rate may include measuring a breakthrough time through the flow channel for at least one of the product fluids.

In some embodiments, the method may further include supplying a specified inlet flowrate or inlet pressure of the reactant fluid to the first fluid port using a fluid pump.

Other aspects and advantages of the claimed subject matter will be apparent from the following description and the appended claims.

DETAILED DESCRIPTION

In one aspect, embodiments disclosed herein relate to microfluidic devices and methods for accurately calculating the reaction rate between a solid and a flowing fluid. These devices and methods enable the calculation of a reaction rate in real-time under flowing conditions, which is much more precise than existing devices and methods.

Embodiments of the present disclosure may provide at least one of the following advantages. In particular, embodiments allow direct observation of the multiphysics process of porous media flow through the geo-material flow cell by enabling the visualization and understanding of rock/fluid interactions. Such rock/fluid interactions are particularly relevant to a variety of subsurface engineering applications, including geologic $CO_2$ storage, geothermal energy, and enhanced oil recovery.

Additionally, embodiments of the microfluidic devices presented offer a technique to investigate a natural formation material in an essentially unlimited number of laboratory tests. Thus, using a single device, multiple fluid/solid chemical reactions may be assessed, including direct observations of the flow and transport of fluids within porous and fractured media. Consequently, the described method enables improved understanding of pore-scale fluid behavior in porous media and the study of fundamental fluid/rock interactions, such as those relevant to enhanced hydrocarbon recovery.

Figure 1:
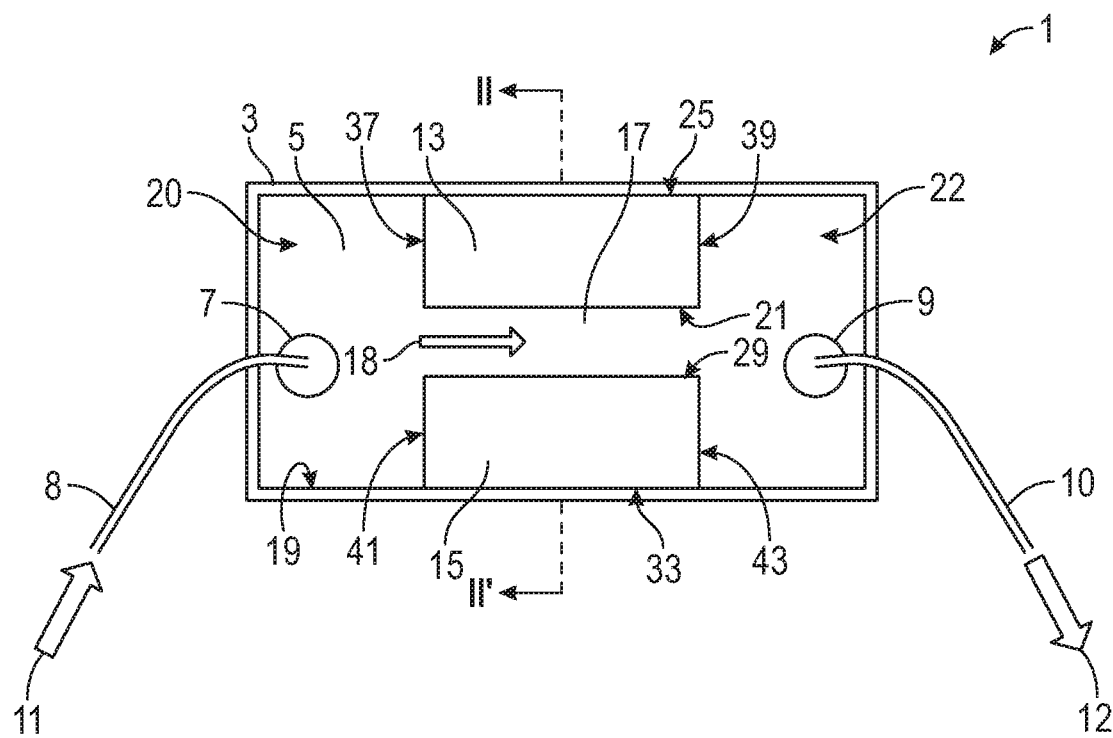
FIG. 1 is a plan view of an embodiment of a testing apparatus.
Figure 2:
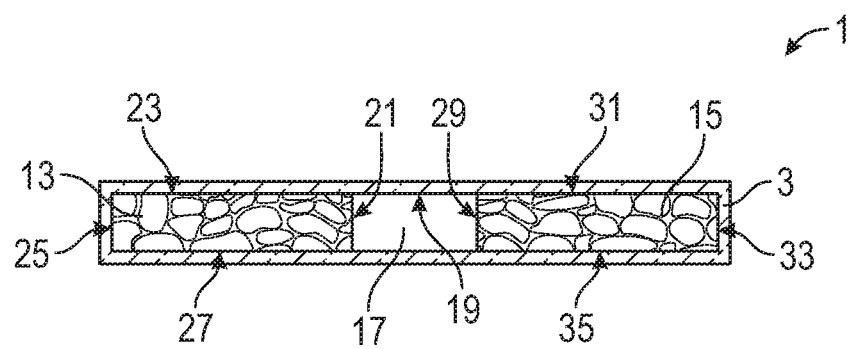
FIG. 2 depicts a cross-section of the testing apparatus shown in FIG. 1 between II and II'.

FIG. 1 depicts a plan view of an embodiment of a testing apparatus 1. Testing apparatus 1 includes a testing apparatus body 3 that is sealed and defines a testing void 5. FIG. 2 depicts a cross-section of testing apparatus 1 between II and II'.

Testing apparatus body 3 may be partially or fully formed of a material that is chemically-resistant. Here, chemically-resistant means a material that does not significantly react with any of the fluids (such as reactants and products) within testing void 5. Such chemical resistance may prevent significant chemical degradation of testing apparatus body 3 by any present chemicals. Some embodiments of testing apparatus body 3 may be formed of a glassy polymer, a glass, or a transparent ceramic. Testing apparatus body 3 may be formed of a single material or multiple materials. One potential material is polydimethylsiloxane (PDMS).

One or more embodiments of testing apparatus body 3 may be partially or fully transparent. A partially transparent testing apparatus body 3 may describe a testing apparatus body 3 where not all surfaces are fully transparent, such as one with only some surfaces partially or fully formed of a transparent material. Here, transparent means a material that allows a significant fraction of visible light to pass through. Transparency of testing apparatus body 3 may allow the objects in testing void 5 to be optically imaged during testing.

Testing apparatus 1 also includes a first fluid port 7 having an inlet 8 and a second fluid port 9 having an outlet 10. First fluid port 7 may be used to introduce fluid reactants according to arrow 11 into testing apparatus body 3. Second fluid port 9 may be used to remove fluid from testing apparatus body 3 according to arrow 12.

The fluid entering first fluid port 7 is termed the "reactant fluid." The reactant fluid may be a solution having multiple components and may include one or more liquid(s) or gas(ses). In some embodiments, the reactant fluid may include one or more reactants. In some embodiments, the reactant fluid may be an inorganic or organic acid, such as hydrochloric acid, sulfuric acid, carbonic acid, nitric acid, acetic acid, carboxylic acid, and phosphoric acid. In some embodiments, the reactant fluid may have any pH. In some embodiments, the reactant fluid may include one or more solvents, including water or organic solvents. In some embodiments, the reactant fluid may also include one or more additives, such as surfactants, gelling agents, emulsifiers, and corrosion inhibitors. In some embodiments, the reactant fluid may include one or more colorants to improve the visualization of the fluid flow within testing apparatus 1, such as an essentially inert dye.

The fluid leaving second fluid port 9 is termed the "effluent." The effluent may have multiple components and may include a combination of liquid(s) and gas(ses). In a testing apparatus 1 having multiple outflow ports (like second fluid port 9), the effluent from each outflow port may be the same or different. In some embodiments, the effluent may include at least one product fluid. In some embodiments, the effluent may be a fluid that includes a combination of product fluid(s), unreacted reactant fluid, or additional fluids such as air.

In some embodiments, chemical product resulting from a reaction between the reactant fluid and first and second geomaterials 13, 15 may be one or more salts (which may or may not be in solution) and a gas. For example, the reaction between HCl and limestone ($CaCO_3$) generates $CaCl_2$, $H_2O$, and $CO_2$ (gas). Similarly, the reaction between HCl and dolomite ($CaMg(CO_3)_2$) generates $CaCl_2$, $MgCl_2$, $H_2O$, and $CO_2$ (gas). Thus, the effluent from testing apparatus 1 (with one second fluid port 9) may be a mixture of aqueous salt solution and gaseous $CO_2$. Additionally, a testing apparatus 1 with two second fluid ports 9 may have two, separate effluent streams: an aqueous salt solution and a gaseous $CO_2$.

First fluid port 7 may be located on any surface of testing apparatus body 3 such that fluid flowing into inlet 7 may flow into an upflow region 20 of testing void 5. Similarly, second fluid port 9 may be located on any surface of testing apparatus body 3 such that fluid in a downflow region 22 of testing void 5 may flow out outlet 10. While the embodiment depicted only includes a single outlet 10 for effluent, some embodiments may include two or more outlets 10 for effluent. In particular, some embodiments of testing apparatus 1 may include a first outlet 10 for liquid(s) and a second outlet 10 for gas(ses).

Finally, testing apparatus 1 includes a first geomaterial 13 and a second geomaterial 15. First and second geomaterial 13, 15 are positioned in testing void 5 between first fluid port 7 and second fluid port 9. First and second geomaterial 13, 15 are arranged relative to one another to define a flow channel 17 between first and second geomaterial 13, 15 within testing apparatus body 3. A fluid flow 18 through flow channel 17 is indicated with an arrow.

In some embodiments, each of first and second geomaterials 13, 15 may have any shape, including a rectangular prism (as in FIGS. 1 and 2), a hemisphere, a cube, or a cylindrical segment. Also, first and second geomaterials 13, 15 may have corresponding but irregular shapes. The shape of flow channel 17 may be defined by the shapes of first and second geomaterials 13, 15 and testing apparatus body 3. To that end, flow channel 17 may be defined by a first flow channel side 21 of first geomaterial 13, a second flow channel side 29 of second geomaterial 15, and testing apparatus body 3. In FIGS. 1 and 2, because first and second geomaterials 13, 15 and testing apparatus body 3 are all rectangular prisms, flow channel 17 is a rectangular prism. In some embodiments, flow channel 17 may take any shape, including a rectangular prism (as in FIGS. 1 and 2), a frustum of a cone or pyramid, or a cylinder. Some shapes of flow channel 17 may allow how flow channel 17 shape may impact reaction rates between first and second geomaterials 13, 15 and fluid flow 18. In some embodiments, first flow channel side 21 and second flow channel side 29 may have irregular shape or texture, such as to allow for study of the impact of those factors on reaction rates between first and second geomaterials 13, 15 and fluid flow 18.

As may be more clearly seen in FIG. 2, first geomaterial 13 is coupled to a testing void interior surface 19 on all radial sides except first flow channel side 21. Specifically, a first top side 23, a first outer side 25, and a first bottom side 27 are coupled to testing void interior surface 19 Similarly, second geomaterial 15 is coupled to a testing void interior surface 19 on all radial sides except second flow channel side 29. Specifically, a second top side 31, a second outer side 33, and a second bottom side 35 are coupled to testing void interior surface 19. Consequently, between an upflow region 20 and a downflow region 22 of testing void 5, fluid flow 18 may be restricted to flow channel 17.

Subsequently, only a first upflow side 37, first flow channel side 21, and a first downflow side 39 of first geomaterial 13 and a second upflow side 41, second flow channel side 21, and a second downflow side 43 of second geomaterial 15 are in contact with a fluid within testing apparatus body 3.

First and second geomaterial 13, 15 are formed from a natural formation material. In some embodiments, first geomaterial 13 may be formed from a similar or a different natural formation material than second geomaterial 15. The natural formation material may be any natural formation material of interest. In some embodiments, the natural formation material may be derived from a geologic or oceanic core sample. In some embodiments, the natural formation material may be essentially isotropic or may be anisotropic (for example, may have texture or rock microstructure). In some embodiments, the natural formation material may be collected during oil and gas exploration or drilling.

Natural formations of interest for oil and gas are often anisotropic due to texture. Further, the reaction rate between a fluid and an anisotropic material may vary depending upon the orientation of the material (or relatedly the flow direction of the fluid). Therefore, one having ordinary skill will appreciate how it may be important to design and fabricate testing apparatus 1 to determine the reaction rate between a fluid and a natural formation sample in a particular orientation. In some embodiments, first and second geomaterials 13, 15 may be specifically fabricated from the natural formation material and oriented within testing apparatus body 3 in view of the anisotropy present in the natural formation material.

Preventing chemical reaction between a fluid and one or more ends of first and second geomaterials 13, 15 (meaning, first upflow side 37, first downflow side 39, second upflow side 41, and second downflow side 43) may allow one to carefully study the interaction of the fluid with one orientation of natural formation material. In one or more embodiments, contact between the fluid flowing through testing void 5 and one or more of first upflow side 37, first downflow side 39, second upflow side 41, and second downflow side 43 may be restricted or essentially prevented. In some embodiments, such fluid contact may be restricted with a physical or chemical barrier on first or second geomaterial(s). In some embodiments, such a barrier may be a coating (for example, a polymeric, metallic, or ceramic coating) on first or second geomaterial(s) 13, 15 or a chemically-resistant material (for example, the material used to form the testing apparatus body 3) bonded to first or second geomaterial(s) 13, 15. Such barriers may change the surface area of first and second geomaterials 13, 15 in contact with and, thus, able to react with the reactant fluid, as discussed further.

Figure 3:
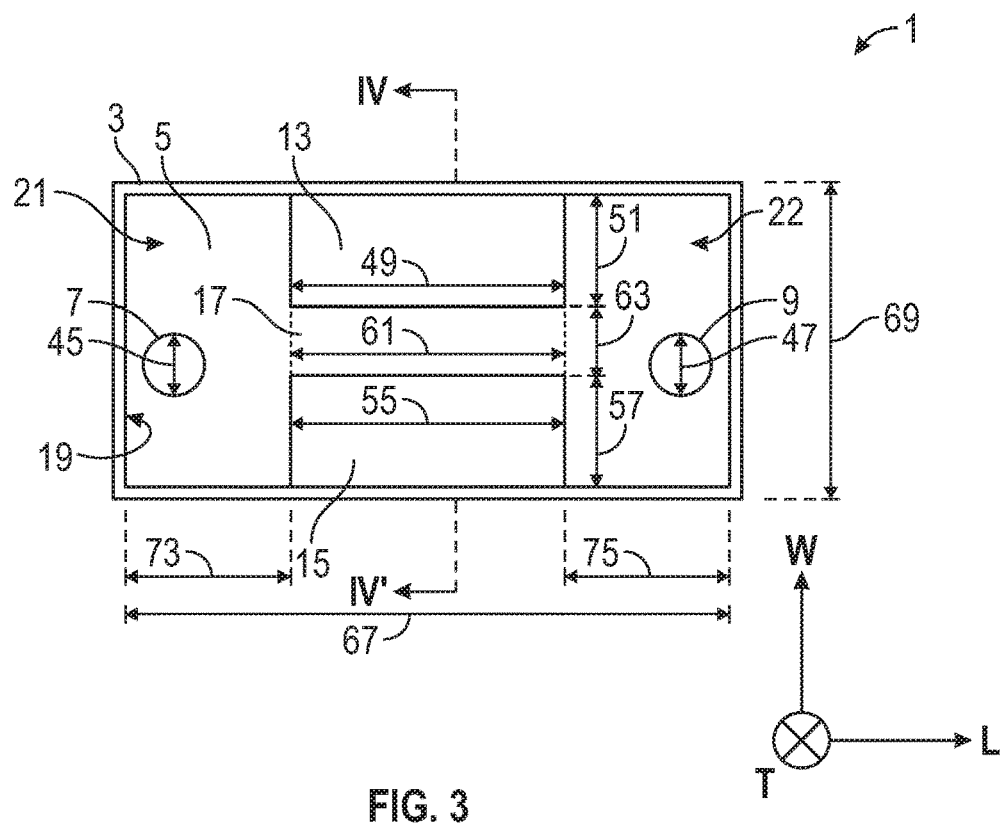
FIG. 3 depicts a plan view of a similar testing apparatus to that shown in FIG. 1.
Figure 4:
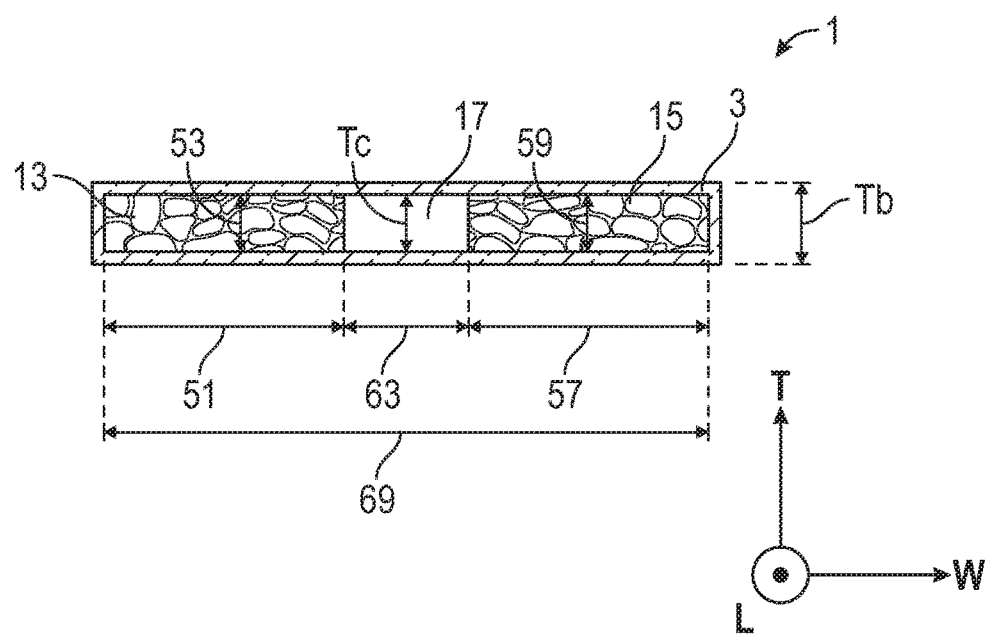
FIG. 4 depicts a cross-section of the testing apparatus shown in FIG. 3 between IV and IV'.

FIG. 3 depicts a plan view of a similar testing apparatus 1 to that shown in FIG. 1. FIG. 4 depicts a cross-section of testing apparatus 1 between IV and IV'. Both FIGS. 3 and 4 include measurements that may be important in one or more embodiments. Given the importance of testing void 5 as defined by testing apparatus body 3 (for assembly of and fluid flow within testing apparatus 1), many measurements of testing apparatus body 3 may be measuring distances within testing apparatus body 3, excluding the thickness of the material that forms testing apparatus body 3. By convention as indicated in FIGS. 3 and 4, length (L) is measured parallel to the flow direction, width (W) is measured perpendicular to the flow direction in a plan view (as in FIG. 3), and thickness (T) is measured perpendicular to the flow direction in a cross-sectional view (as in FIG. 4).

First fluid port 7 has a diameter 45 and second fluid port 9 has a diameter 47. Diameters 45, 47 of first and second fluid ports 7, 9 may be sufficiently large to supply the specified fluid flow inflow and outflow rate. In some embodiments, diameters 45, 47 of first and second fluid ports 7, 9 may be the same or different. In some embodiments, each of diameters 45, 47 may be between 0.01 millimeters (mm) and 5 mm. In some embodiments, both diameters 45, 47 may be about 1.5 mm.

First geomaterial 13 is a rectangular prism with a length 49; a width 51; and a thickness 53. Second geomaterial 15 is a rectangular prism with a length 55, a width 57, and a thickness 59. In some embodiments, each of widths 51, 57 may be between 0.1 mm and 10 mm. In some embodiments, both widths 51, 57 may be about 4 mm. Flow channel 17 is positioned between first and second geomaterials 13, 15. Flow channel 17 has a length 61, a width 63, and a thickness 65. Testing void 5 may have a length 67, a width 69, and a thickness 71. In some embodiments, length 67 may be between 0.1 mm and 100 mm, such as about 25 mm. In some embodiments, width 69 may be between 0.01 mm and 100 mm, such as about 10 mm. Finally, upflow region 20 may have a length 73 and downflow region 22 may have a length 75.

In some embodiments, as in FIG. 4, thicknesses 53, 59 of first and second geomaterials 13, 15 may be roughly equivalent to thickness 71 of testing void 5. Roughly equivalent thicknesses of thicknesses 53, 59, 71 of first and second geomaterials 13, 15 and testing void 5 may allow for ease of assembly of testing apparatus body. Also, in some embodiments, thickness 65 of flow channel 17 may be roughly equivalent to thickness 71 of testing void 5 and thicknesses 53, 59 of first and second geomaterials 13, 15. One having skill in the art will appreciate that, for the components to be assembled and bonded as in FIGS. 3 and 4, thickness 71 of testing void 5 may be slightly larger than thicknesses 53, 59 of first and second geomaterials 13, 15 to accommodate manufacturing tolerances and any bonding agents used to join first and second geomaterials 13, 15 to testing apparatus body 3.

In some embodiments, thicknesses 53, 59, 71, 65 of first and second geomaterials 13, 15, testing void 5, and flow channel 17 may be between 0.01 mm and 10 mm. In some embodiments, thicknesses 53, 59, 71, 65 may be about 1.0 mm.

Flow channel 17 is defined by first and second geomaterials 13, 15 and testing apparatus body 3. In some embodiments, lengths 49, 55 of first and second geomaterials 13, 15 may be the same or different. In some embodiments, lengths 49, 55 may be between 1 mm and 100 mm. In some embodiments, both lengths 49, 55 may be about 10 mm.

When lengths 49, 55 of first and second geomaterials 13, 15 are equal, length 61 of flow channel 17 may be equal to length 49, 55 of first and second geomaterials 13, 15. When lengths 49, 55 of first and second geomaterials 13, 15 are different, length 61 of flow channel 17 may be between length 49 of first geomaterial 13 and length 55 of second geomaterial 15 (such as, an average of the lengths 49, 55). In some embodiments, lengths 49, 55, 61 may all be about 10 mm.

Width 63 of flow channel 17 may be defined by widths 51, 57, 69 of first and second geomaterials 13, 15 and testing apparatus body 3. As discussed previously, width 63 of flow channel 17 may vary depending upon the shapes and sizes of first and second geomaterials 13, 15. One of skill in the art will appreciate that flow channel 17 may or may not have a single width 63 depending upon the shapes of first and second geomaterials 13, 15, and instead may have a variable width 63. In some embodiments, width 63 of flow channel 17 may be between 0.01 mm and 10 mm. In some embodiments, width 63 of flow channel 17 may be between 0.01 mm and 4 mm. In some embodiments, width 63 of flow channel 17 may be about 2.0 mm.

Given the above range of dimensions for width 63 and thickness 17, a cross-sectional area of flow channel 17 may be between 0.0001 mm$^2$ and 100 mm$^2$. In some embodiments, cross-sectional area of flow channel 17 may be about 2.0 mm$^2$.

Lengths 73, 75 of upflow and downflow regions 20, 21 may depend on by lengths 67, 49, 55 of testing void 5 and first and second geomaterials 13, 15 as well as the positioning of first and second geomaterials 13, 15 in a length direction. One having skill in the art will appreciate that upflow or downflow regions 20, 21 may have a variable length 73, 75, such as if first and second geomaterials 13, 15 have different lengths 49, 55 or if first and second geomaterials 13, 15 are not positioned at the same location in the length direction. Lengths 73, 75 of upflow and downflow regions 20, 21 may be roughly equal or different. In some embodiments, lengths 73, 75 of upflow and downflow regions 20, 21 may be between 0.5 mm and 100 mm. In some embodiments, lengths 73, 75 of upflow and downflow regions 20, 21 may be between approximately 7.5 mm.

The volume of upflow region 20 depends on thickness 71 and width 69 of testing void 5 and length 73 of upflow region 20. In some embodiments, the volume of upflow region 20 may be sufficiently large so as not to impede fluid flow 18 into flow path 17. Such a configuration allows upflow region 20 to be an essentially unlimited source for the reactant fluid. Similarly, the volume of downflow region 22 depends on thickness 71 and width 69 of testing void 5 and length 75 of downflow region 22. In some embodiments, the volume of upflow region 20 may be sufficiently large so as not to impede fluid flow 18 out of flow path 17. Such a configuration allows downflow region 22 to be an essentially unlimited sink for the effluent.

For a reaction between a solid and a fluid to occur, the components must be in contact. Additionally, the reaction rate may depend on the surface area of the solid where such interaction may occur (hereinafter termed the "contact area"). Here, the device may be used to measure the reaction rate between natural formation material (meaning, first and second geomaterials 13, 15) and the reactant fluid. In the depicted embodiment, only first upflow side 37, first flow channel side 21, first downflow side 39, second upflow side 41, second flow channel side 21, and second downflow side 43 may be in contact with a fluid within testing apparatus body 3. Therefore, in view of FIGS. 3 and 4, one having skill in the art will readily be able to calculate the contact area of first and second geomaterials 13, 15 as a sum of the surface areas of each of those faces of first and second geomaterials 13, 15. Additionally, in some embodiments as detailed above, surface(s) of first and second geomaterials 13, 15 may be protected from contact with the reaction fluid, such as with a coating or additional bonded components. On having skill in the art will appreciate how such barriers may alter the contact area between first and second geomaterials 13, 15 and the reactant fluid. The contact area between first and second geomaterials 13, 15 and the reactant fluid may be fundamental in determining the reaction rate, as in Step S13 discussed further.

Given the above range of dimensions for first and second geomaterials 13, 15, a contact area between first and a second geomaterials 13, 15 and the reactant fluid may be between 0.0002 mm$^2$ and 2400 mm$^2$. In some embodiments, a contact area of flow channel 17 may be about 36 mm$^2$. In some embodiments, a contact area of flow channel 17 may be less than about 40 mm$^2$.

Figure 5:
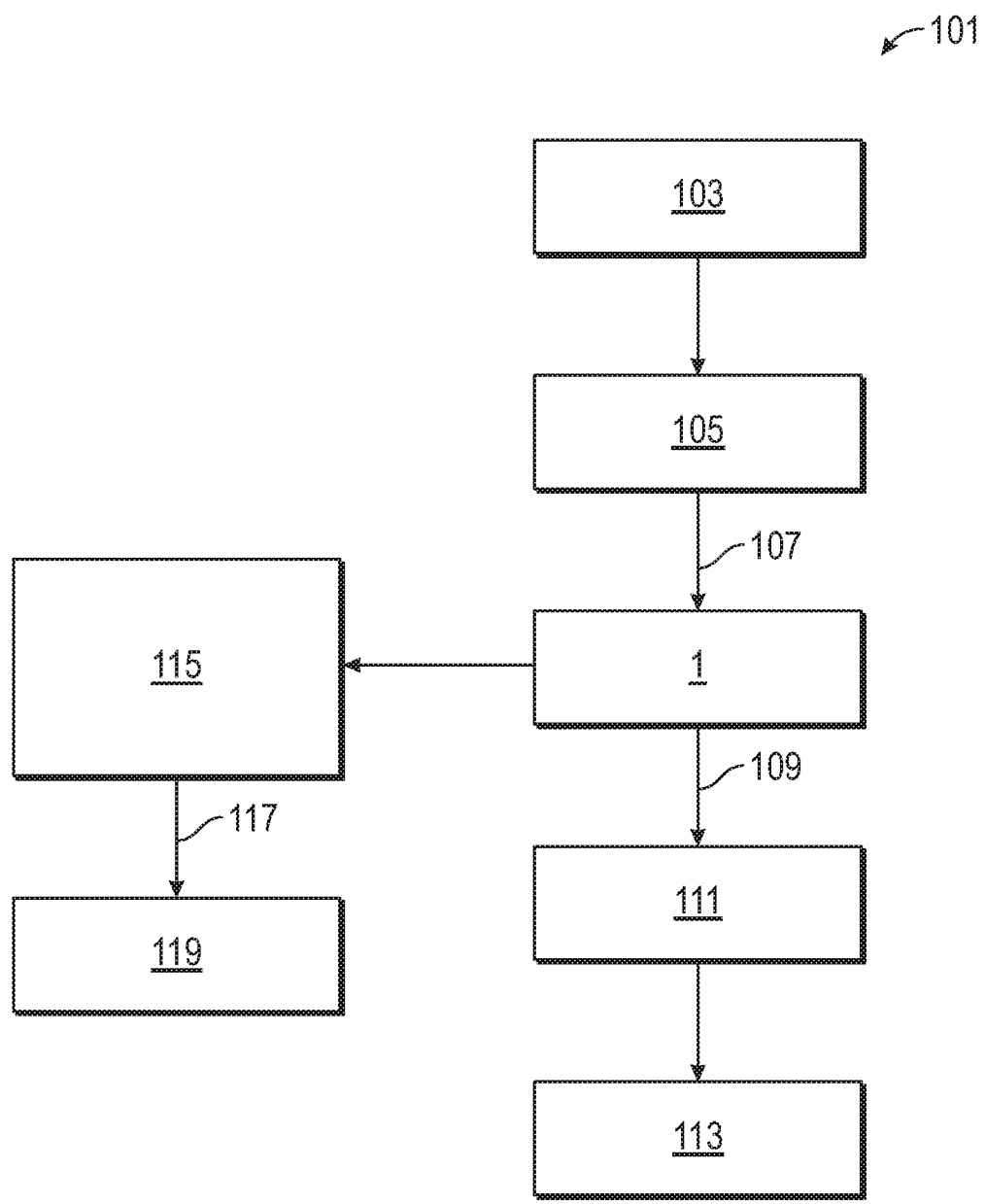
FIG. 5 depicts an embodiment of a testing apparatus within a testing system.

FIG. 5 depicts testing apparatus 1 within a testing system 101. A reactant source 103 supplies a reactant fluid to a fluid pump 105. Fluid pump 105 is fluidly connected to testing apparatus 1 via an inlet connector 107 connected to inlet 8. Outlet 10 is fluidly connected via a fluid connector 109 to an effluent analysis system 111. Flow analyzer 111 is fluidly connected to an effluent connector 113. While the embodiment depicted in FIG. 5 only includes a single outlet 10 for effluent, some embodiments may include two or more outlets 10 fluidly connected to one or more downflow comments.

Additionally, FIG. 5 depicts testing apparatus 1 including an image capturing device 115 connected via a data connection 117 to an image processor 119.

In some embodiments, image capturing device 115 may be any device that can capture and store digital images, such as an optical camera or an optical microscope having a charge coupled device (CCD) camera. Image capturing device 115 may be used to generate images of the interaction between the reaction fluid and first and second geomaterials 13, 15 within testing apparatus 1. Some embodiments of image capturing device 115 may employ magnification or zoom to magnify the images of the behavior within testing apparatus 1.

In some embodiments, testing apparatus 1 may be located on an optical microscope sample stage and within the field of view of said optical microscope objective during fluidic testing. In some embodiments, the optical microscope may have a long working distance, such as found in a stereo microscope, to provide sufficient space between the microscope sample stage and the microscope objectives for testing apparatus 1 and/or to increase the field of view of the microscope.

Images captured by image capturing device 115 may be transmitted to image processor 119 for storage and further analyses. Image processor 119 may be any type of computer capable of viewing and/or analyzing microscopy images, such as a personal or a cloud computer. Image processor 119 may employ any sort of software to analyze the microscopy images known in the art, including software that employs machine learning and/or artificial intelligence.

One or more embodiments of testing system 101 may include reactant source 103.

Reactant source 103 may serve to store and supply one or more reactant fluids prior to their introduction to testing apparatus 1. In some embodiments, reactant source 103 may store and supply a reactant fluid. Reactant source 103 may have any form suitable for supplying the reactant fluid, which may vary depending on the phase (liquid or gas) of the reactant fluid.

In some embodiments, the reactant fluid stored in reactant source 103 may be prepared for instruction into testing apparatus 1.

Some embodiments of testing system 101 may lack reactant source 103, such as those that supply the reactant fluid to components downflow from a building water or gas source.

One or more embodiments of testing system 101 may include fluid pump 105, such as a syringe pump, a mass flow controller, a gas regulator, or some other similar device well known in the art. In some embodiments, fluid pump 105 may control the supply of fluid to testing apparatus 1. Specifically, in some embodiments, fluid pump 105 may supply the reactant fluid to first fluid port 7 via inlet connector 107 fluidly connected to inlet 8. In some embodiments, fluid pump 105 may supply the reactant fluid at a specified inlet flowrate to testing apparatus 1.

Some embodiments of testing system 101 may lack fluid pump 105, such as those that supply the reactant fluid to testing apparatus 1 using an alternative force, such as gravity or inherent pressure generated by the source.

One or more embodiments of testing system 101 may include effluent analysis system 111. In some embodiments, effluent analysis system 111 may include one or more components for analyzing an effluent from testing apparatus 1. In some embodiments, effluent analysis system 111 may include a chemical analyzer (such as a mass spectrometer) to determine a chemical composition of one or more components within the effluent. In some embodiments, effluent analysis system 111 may include a flow meter for measuring an effluent flowrate. In some embodiments, effluent analysis system 111 may include an apparatus for measuring a quantity of the effluent (such as a volumeter for measuring an effluent volume or a scale for measuring an effluent mass).

Some embodiments of testing system 101 may lack effluent analysis system 111, such as those that use alternative means when calculating reaction rate.

One or more embodiments of testing system 101 may include effluent container 113. In some embodiments, effluent container 113 may capture, store, or both the effluent once it has exited testing apparatus 1. Effluent container 113 may have any form suitable for collecting the effluent, which may vary depending on the phase (liquid or gas) of the effluent.

Some embodiments of testing system 101 may lack effluent container 113, such as those that do not introduce sufficient reactant fluids into testing apparatus 1 to generate a volume of effluent that cannot be contained within testing apparatus 1 and effluent analysis system 111.

Figure 6:
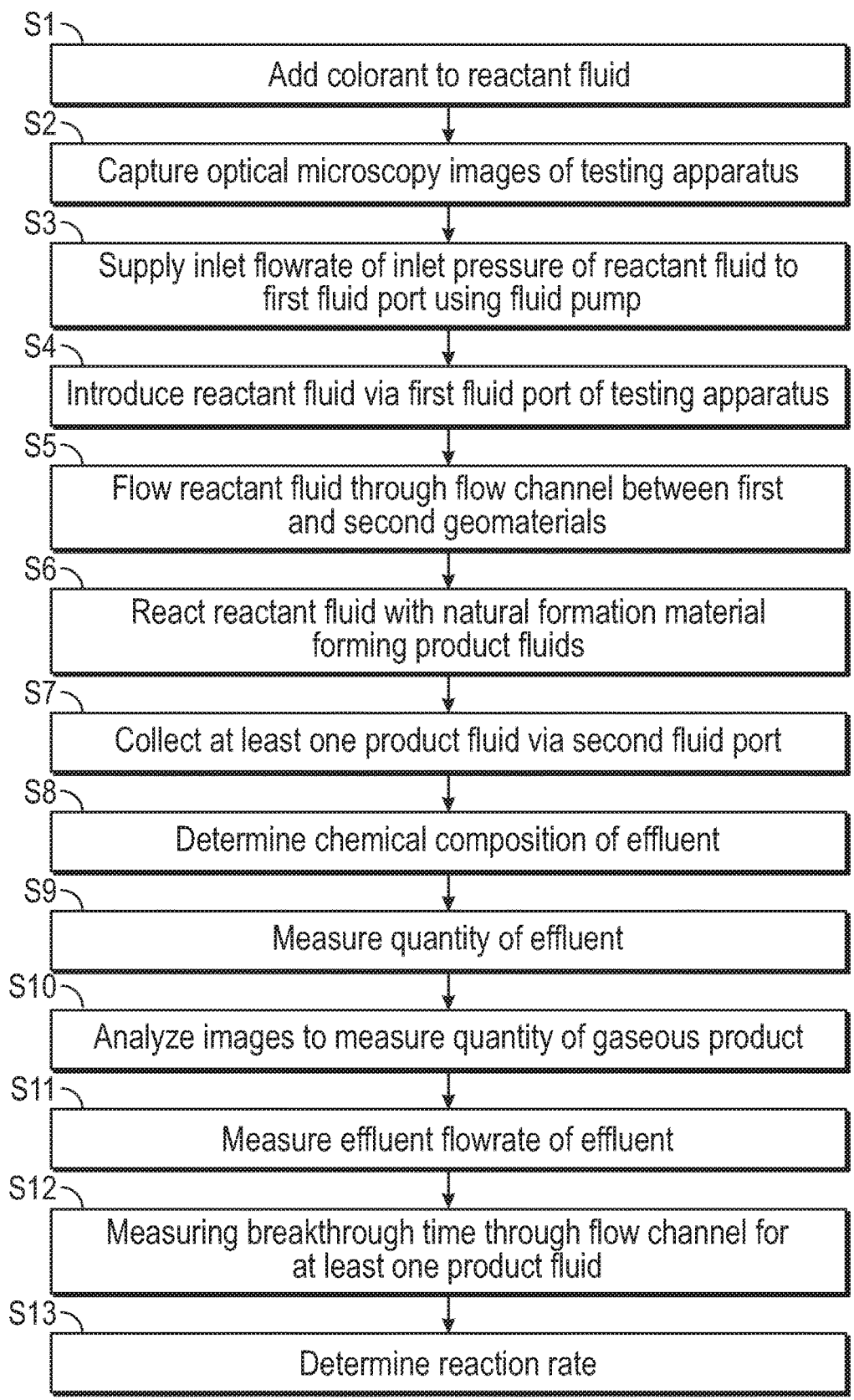
FIG. 6 depicts a flow chart of one or more embodiments of the method of use of a testing apparatus to determine a reaction rate between a reactant fluid and first and second geomaterials.

FIG. 6 depicts a flow chart of one or more embodiments of the method of use of testing apparatus 1 to determine a reaction rate between a reactant fluid and first and second geomaterials 13, 15.

Step S1 is adding colorant to the reactant fluid. One or more embodiments may include step S1. Embodiments of the method may or may not include step S1.

As discussed previously, colorant may be used to improve the optical visibility of fluid flow 18 through testing apparatus 1. Adding a colorant to the reactant fluid may occur prior to introduction of the fluid into testing apparatus 1, in some embodiments. In some embodiments, the reactant fluid within reactant source 103 may include both the colorant and the reactant(s).

Step S2 is capturing optical microscopy images of testing apparatus 1 with microscope 115. Embodiments of the method may or may not include step S2.

Some embodiments of the method may include capturing optical microscopy images of testing apparatus 1. Some embodiments of the method may include analyzing said optical microscopy images, as discussed further.

In some embodiments, capture of optical microscopy images using optical microscope 115 may begin before introduction of the reactant fluid into inlet 8, before introduction of the reactant fluid into first fluid port 7, before contact between the reactant fluid and first and second geomaterials 13, 15, or immediately upon contact between the reactant fluid and first and second geomaterials 13, 15. In some embodiments, capture of optical microscopy images may end upon breakthrough of fluid flow 18 at first downflow side 39 of first and second geomaterials 13, 15, after introduction of the reactant fluid into second fluid port 8, after introduction of the reactant fluid into outlet 10, after a prescribed elapsed time, after a reaction steady state has been reached, or after consumption of first and second geomaterials 13, 15.

Some embodiments may not include step S2, such as those that use methods for determining the reaction rate that do not rely on image analysis.

Step S3 is supplying an inlet flowrate or an inlet pressure of the reactant fluid to first fluid port 7 using fluid pump 105 as detailed previously. Embodiments of the method may or may not include step S3.

In some embodiments, fluid pump 105 may be used to supply an inlet flowrate or inlet pressure to testing apparatus 1. For a microfluidic device system, fluid pump 105 may supply a specified inlet flowrate between 0.1 and 10,000 microliters per minute (µL/min) (such as between 10 and 500 µL/min). The specified inlet flowrate may be constant or variable. In some embodiments, fluid pump 105 may supply the reactant fluid to testing apparatus 1 at a specified inlet pressure. In some embodiments, fluid pump 105 may supply a fixed quantity of the reactant fluid to testing apparatus 1. In some embodiments, fluid pump 105 may supply the reactant fluid for a fixed duration. In some embodiments, the fixed experimental duration or fixed quantity of reactant fluid may be used in determining the reaction rate, as in step S13 discussed further.

Some embodiments of testing system 101 may not include step S3, such as those that lack fluid pump 105.

Step S4 is introducing the reactant fluid via first fluid port 7 of testing apparatus 1.

As discussed previously, the reactant fluid is introduced into testing apparatus body 3 via first fluid port 7.

Step S5 is flowing the reactant fluid through flow channel 17 between first and second geomaterials 13, 15. As discussed previously, the reactant fluid flows through flow channel 17. In some embodiments, the reactant fluid interacts with first and second geomaterials 13, 15.

Step S6 is reacting the reactant fluid with first and second geomaterials 13, 15 formed from natural formation material(s) to form at least one product fluid. As discussed previously, the reactant fluid reacts with first and second geomaterials 13, 15, where first and second geomaterials 13, 15 are formed from natural formation material(s). As discussed previously, the reaction between reactant fluid and first and second geomaterials 13, 15 (formed of natural formation material(s)) may form one or more product fluids.

Step S7 is collecting an effluent exiting testing apparatus 1, where the effluent includes at least one of the product fluids. Embodiments of the method may or may not include step S7.

Some embodiments of the method may include collecting the effluent exiting testing apparatus 1, where the effluent includes at least one of the product fluids as discussed previously. Thus, the collected effluent may be liquid, gaseous, or a mixture. Such products may be collected via second fluid port 9. Once collected, in some embodiments, the effluent may be further analyzed as discussed further. In some embodiments, the effluent may be stored in effluent container 113.

Some embodiments may not include step S7, such as those that do not introduce sufficient reactant fluids into testing apparatus 1 to generate a volume of effluent that cannot be contained within testing apparatus 1 or those that do not need to collect the effluent for further testing.

Step S8 is determining chemical composition of the effluent. Embodiments of the method may or may not include step S8.

Some embodiments of the method may include determining a chemical composition of the effluent. Such determination may be performed using a spectrometer or any other chemical characterization method known in the art. Such chemical analysis may be performed with effluent analysis system 111, as discussed previously. The results of such chemical analysis may be used in determining the reaction rate, as in step S13 discussed further.

Some embodiments may not include step S8, such as those that generate a known product and thus do not require an experimentally determined chemical composition of the product fluid(s).

Step S9 is measuring a quantity of the effluent. Embodiments of the method may or may not include step S9.

Some embodiments of the method may include measuring a quantity (meaning a volume or a mass) of the effluent. Such determination may be performed using an apparatus that measures the mass or volume of the effluent, such as a volumeter or a scale. Such quantity analysis may be performed with effluent analysis system 111, as discussed previously. The results of such quantity analysis may be used in determining the reaction rate, as in step S13 discussed further.

Some embodiments may not include step S9, such as those that use methods for determining the reaction rate that do not rely on directly measuring the effluent quantity.

Step S10 is analyzing optical images to measure a quantity of gaseous product. Embodiments of the method may or may not include step S10.

Some embodiments of the method may include measuring a quantity of gaseous product from the images captured by image capturing device 115. Some embodiments of the method may include measuring a volume of the bubbles of gaseous product generated by the reaction between the reactant fluid and first and second geomaterial 13,15. One having skill in the art will appreciate how to determine the quantity of a gas from the volume of said gas. Such image analysis may be performed with image processor 119, as discussed previously. The quantity of gaseous product generated by the reaction may be used in determining the reaction rate, as in step S13 discussed further.

Some embodiments may not include step S10, such as those that use methods for determining the reaction rate that do not rely on image analysis to determine the effluent quantity.

Step S11 is measuring effluent flowrate of at least one product fluid. Embodiments of the method may or may not include step S11.

Some embodiments of the method may include measuring a flowrate of the effluent.

Such determination may be performed using a flow meter. Such quantity analysis may be performed with effluent analysis system 111, as discussed previously. The effluent flowrate may considered a measure of the produced quantity of at least one product fluid as a function of time. Thus, in some embodiments, the effluent flow rate may be considered a ratio between a reaction duration and a quantity of at least one of the product fluids. The results of such flowrate analysis may be used in determining the reaction rate, as in step S13 discussed further.

Some embodiments may not include step S11, such as those that use methods for determining the reaction rate that do not rely on the effluent flowrate.

Step S12 is measuring the breakthrough time through flow channel 17 for at least one product fluid. Embodiments of the method may or may not include step S12.

Some embodiments of the method may include measuring a breakthrough time through flow channel 17. As detailed previously, the breakthrough time may be a time that elapses between initial contact of the reactant fluid with first and second geomaterials 13, 15 and when fluid initially exits flow channel 17. Additionally, the breakthrough time may be the time. The fluid exiting flow channel 17 may be a mixture of one or more liquids. In some embodiments, the liquid that flow out of flow channel 17 may include a combination of un-reacted reactant fluid; product fluid(s) which may include solute(s); additive(s); and colorant(s).

Some embodiments may not include step S12, such as those that allow interaction to continue for a pre-determined time before quantifying the product(s).

In some embodiments, the breakthrough time may be determined using the images captured by image capturing device 115. Such image analysis may be performed with image processor 119. In some embodiments, the addition of colorant(s) into the reactant fluid may aide in determining the breakthrough time, particularly when the reactant fluid would otherwise be transparent.

Step S13 is determining the reaction rate between the reactant fluid and the natural formation material(s).

Fundamentally, the reaction rate (in mole/cm$^2$s) is a quantity of one or more produced product fluids divided by the product of a reaction duration and a contact area. One having skill in the art will appreciate how to convert the volume or mass of a product fluid into the number of moles of the product fluid. One or more embodiments of the method may include one or more of Steps S3, S9, S10, and S11 as detailed above to determine the quantity (for example, volume, mass, or flow rate) of one or more product fluid(s). In one or more embodiments of the method, may include a fixed reaction time (such as in Step S3) or one or more of Steps S11 and S12 as detailed above to determine the reaction duration. In one or more embodiments of the method, the contact area between the reactant fluid and first and second geomaterials 13, 15 may be determined as detailed previously.

In some embodiments, testing apparatus 1 may be formed in the following way. A mold may be prepared by gluing a thin glass microscope slide (for example, 25 mm×10 mm×1 mm) into a plastic petri-dish. A standard ratio of 10:1 mixture of PDMS monomer and curing agent (for example, Sylgard™ 184, Dow Chemical) may be mixed and degassed under vacuum for 20 to 30 min to remove trapped air bubbles. The degassed PDMS mixture may be poured into the mold and cured by baking in an oven at 65° C. for 4 hours. Upon removal from the mold, the PDMS may have the form of 5 sides of the testing apparatus body (the top side of testing apparatus body 3 is addressed further).

To ensure that the testing apparatus 1 is fully sealed, first and second top sides 23, 31 and first and second bottom sides 27, 35 may be brushed with liquid PDMS and placed in the PDMS testing apparatus, with an appropriate flow channel 17 between. The present testing apparatus body 3 may be cured at 65° C. for 60 minutes. The PDMS coating on first and second geomaterials 13, 15 may eliminate fluid gaps around first and second geomaterials 13, 15. Two 1.5 mm diameter first and second fluid ports 7, 9 may be punched using a biopsy puncher. The present testing apparatus body 3 (containing first and second geomaterials 13, 15) and a PDMS slab (a top side of testing apparatus body 3) may be treated with oxygen plasma (Harrick Plasma Cleaner, NY, USA) for 3.5 minutes and, upon removal, may be immediately put into conformal contact to create a siloxane bond.

Successfully bonding the PDMS slab to the prepared testing apparatus body 3 containing first and second geomaterials 13, 15 creates a fluidly-sealed testing apparatus body 3 that encapsulates first and second geomaterials 13, 15. Finally, 1.5 mm flow tubes may be connected to first and second fluid ports 7,9 to form inlet 8 and outlet 10.

Alternative methods for forming the testing apparatus 1 will be appreciated by one of ordinary skill in the art.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A testing apparatus, comprising:
   a sealed, chemically-resistant testing apparatus body defining a testing void;
   a first fluid port located on a first surface of the testing apparatus body such that fluid can be introduced into an upflow region of the testing void,
   a second fluid port located on a second surface of the testing apparatus body such that fluid can be removed from a downflow region of the testing void; and
   a first geomaterial and a second geomaterial in the testing void, wherein the first and second geomaterials are positioned between the first fluid port and the second fluid port and are arranged such that a flow channel is provided between the first and second geomaterials,
   the first and second geomaterials are coupled to a testing void interior surface so as to restrict flow to the flow channel between the upflow region and the downflow region of the testing void, and
   the first and second geomaterials are comprised of a natural formation material,
   wherein the thickness of the flow channel is roughly equivalent to thickness of the testing void,
   wherein the thicknesses are measured perpendicular to the flow direction in a cross-sectional view of the testing apparatus along a direction perpendicular to the flow direction, while width is measured perpendicular to the flow direction in a plan view,
   wherein the flow channel takes a shape of rectangular prism, a frustum of a cone or pyramid, or a cylinder, and
   wherein the first geomaterial does not contact the second geomaterial.

2. The testing apparatus according to claim 1, wherein the testing apparatus body is at least partially transparent, and wherein the first geomaterial is formed from a similar or a different natural formation material than the second geomaterial.

3. The testing apparatus according to claim 1, wherein the flow channel has a cross-sectional area of 10 square millimeters or less.

4. The testing apparatus according to claim 1, wherein the first geomaterial has a first upflow side facing the upflow region, a first flow channel side facing the flow channel, and a first downflow side facing the downflow region, the second geomaterial has a second upflow side facing the upflow region, a second flow channel side facing the flow channel, and a second downflow side facing the downflow region, total area of the first upflow side, the first flow channel side, the first downflow side, the second upflow side, the second flow channel side, and the second downflow side_is 40 square millimeters or less.

5. The testing apparatus according to claim 1, wherein the flow channel has a width of 4 millimeters or less.

6. The testing apparatus according to claim 1, wherein the first geomaterial has a first flow channel side facing the flow channel, and the second geomaterial has a second flow channel side facing the flow channel, wherein the first flow channel side and the second flow channel side have irregular texture.

7. A testing system, comprising:
   a testing apparatus, the testing apparatus comprising:

a sealed, chemically-resistant testing apparatus body defining a testing void;

a first fluid port located on a first surface of the testing apparatus body such that fluid can be introduced into an upflow region of the testing void;

a second fluid port located on a second surface of the testing apparatus body such that fluids can be removed from a downflow region of the testing void; and a first geomaterial and a second geomaterial, wherein the first and second geomaterials are positioned downflow from the first fluid port and are arranged such that a flow channel is provided between the first and second geomaterials, the first and second geomaterials are coupled to a testing void interior surface so as to restrict flow to the flow channel between the upflow region and the downflow region of the testing void, and the first and second geomaterials are comprised of a natural formation material;

a fluid pump fluidly connected to the first fluid port for supplying a reactant fluid, wherein the thickness of the flow channel is roughly equivalent to thickness of the testing void, wherein the thicknesses are measured perpendicular to the flow direction in a cross-sectional view of the testing apparatus along a direction perpendicular to the flow direction, while width is measured perpendicular to the flow direction in a plan view, wherein the flow channel takes a shape of rectangular prism, a frustum of a cone or pyramid, or a cylinder, and wherein the first geomaterial does not contact the second geomaterial.

8. The testing system according to claim 7, the testing system further comprising:

a flow meter for measuring an effluent flowrate of one or more of the fluids removed from the downflow region of the testing void, and wherein the first geomaterial is formed from a similar or a different natural formation material than the second geomaterial.

9. The testing system according to claim 7, the testing system further comprising:

an image capturing device configured to capture images of the testing apparatus during flow of the reactant fluid; and an image processor communicatively connected to the image capturing device configured to process the images.

10. The testing system according to claim 7, the testing system further comprising:

an effluent container fluidly connected to the second fluid port for collecting product fluids.

11. The testing system according to claim 7, the testing system further comprising:

a chemical analyzer for determining a chemical composition of one or more of the product fluids.

* * * * *